(12) United States Patent
Laurenzo et al.

(10) Patent No.: US 8,458,173 B2
(45) Date of Patent: Jun. 4, 2013

(54) COMPUTER-IMPLEMENTED METHODS AND SYSTEMS FOR MULTI-LEVEL GEOGRAPHIC QUERY

(75) Inventors: Terry M. Laurenzo, Denver, CO (US); David William Nesbitt, Port Deposit, MD (US); Eric Beyeler, Mount Joy, PA (US)

(73) Assignee: Mapquest, Inc., Denver, CO (US)

( * ) Notice: Subject to any disclaimer, the term of this patent is extended or adjusted under 35 U.S.C. 154(b) by 200 days.

(21) Appl. No.: 12/968,223

(22) Filed: Dec. 14, 2010

(65) Prior Publication Data

US 2011/0145228 A1 Jun. 16, 2011

Related U.S. Application Data

(60) Provisional application No. 61/286,694, filed on Dec. 15, 2009.

(51) Int. Cl.
*G06F 17/30* (2006.01)
*G06F 7/00* (2006.01)

(52) U.S. Cl.
USPC .......................................... 707/723

(58) Field of Classification Search
USPC .......................................... 707/723
See application file for complete search history.

(56) References Cited

U.S. PATENT DOCUMENTS

| | | | |
|---|---|---|---|
| 6,954,697 B1 | 10/2005 | Smith | |
| 2003/0036842 A1* | 2/2003 | Hancock | 701/200 |
| 2004/0139080 A1* | 7/2004 | Schmidt et al. | 707/100 |
| 2004/0209517 A1* | 10/2004 | Mase et al. | 439/595 |
| 2005/0283503 A1 | 12/2005 | Hancock et al. | |
| 2008/0188242 A1* | 8/2008 | Carlson et al. | 455/456.5 |
| 2008/0214205 A1* | 9/2008 | Alles et al. | 455/456.1 |

FOREIGN PATENT DOCUMENTS

WO  WO 2006/036866  4/2006

OTHER PUBLICATIONS

International Search Report, mailed on Mar. 15, 2011, in Application No. PCT/US2010/060224, 5 pages.
PCT Written Opinion of the International Searching Authority, mailed on Mar. 15, 2011, in Application No. PCT/US2010/060224, 7 pages.

* cited by examiner

*Primary Examiner* — Kuen Lu
(74) *Attorney, Agent, or Firm* — Finnegan, Henderson, Farabow, Garrett & Dunner, LLP

(57) ABSTRACT

According to one aspect of the present disclosure, a computer-implemented method is provided for processing a query for points of interest (POIs) using a hierarchical grid structure representing a geographic area. The method includes receiving a query for POIs; defining a query footprint for the query based on a location corresponding to the query, wherein the query footprint comprises query spatial identifiers for a plurality of levels of the hierarchical grid structure; matching the query spatial identifiers with one or more POI spatial identifiers organized into a plurality of indexes, wherein each one of the plurality of indexes comprises an index of the POI spatial identifiers for one of the plurality of levels; and providing an output specifying one or more POIs corresponding to the matched POI spatial identifiers.

17 Claims, 8 Drawing Sheets

400

410

| POI ID | Level | Quadrant |
|---|---|---|
| D | 0 | 1 |
| D | 0 | 2 |
| C | 0 | 1 |
| B | 0 | 4 |
| A | 0 | 4 |
|  | 0 |  |
|  | 0 |  |
|  | 0 |  |

420

| POI ID | Level | Quadrant |
|---|---|---|
| D | 0 | 1 |
| D | 0 | 2 |
| C | 0 | 1 |
|  | 0 |  |
|  | 0 |  |
|  | 0 |  |
|  | 0 |  |
|  | 0 |  |

430

| POI ID | Level | Quadrant |
|---|---|---|
| D | 1 | 2 |
| C | 1 | 3 |
| C | 1 | 1 |
|  | 1 |  |
|  | 1 |  |
|  | 1 |  |
|  | 1 |  |
|  | 1 |  |

440

| POI ID | Level | Quadrant |
|---|---|---|
| C | 2 | 2 |
| E | 2 | 1 |
|  | 2 |  |
|  | 2 |  |
|  | 2 |  |
|  | 2 |  |
|  | 2 |  |
|  | 2 |  |

FIG. 4

# COMPUTER-IMPLEMENTED METHODS AND SYSTEMS FOR MULTI-LEVEL GEOGRAPHIC QUERY

RELATED APPLICATION(S)

This application claims the benefit of priority of U.S. Provisional Patent Application No. 61/286,694, filed Dec. 15, 2009, which is incorporated by reference herein in its entirety.

BACKGROUND

1. Technical Field

The present disclosure generally relates to the field of geospatial searching. More particularly, and without limitation, the disclosure relates to computer-implemented methods and systems for providing search results for a geographic-based query.

2. Background

Users are currently able to access and view interactive maps through a wide variety of computing systems, including personal computers, stand-alone personal and automotive navigation systems (e.g., automobile GPS units), mobile telephones, smart phones, personal media players, navigation systems, etc. A stand-alone software running on a computing system, an on-line browser connected to a remote server (e.g., www.mapquest.com), a satellite global positioning system, or a combination of two or more of the aforementioned methods, may provide interactive maps and related services. Interactive maps may allow a user to, for example, access a map of a location (e.g., specific address, city, state, country, etc.) and the surrounding locations. After accessing a location, a user may navigate around the location by zooming in and out and scrolling left, right, up, and down on the map. A user may also use the map to retrieve directions/routes between two or more locations.

Interactive maps may also provide information about various points of interest ("POIs") near a location selected/specified by a user. A POI may be, for example, a specific entity/attraction that is useful or interesting to an individual or a group of individuals or that the individual or the group may want to visit. By way of example, POIs on a map display may represent gas stations, rest areas, hotels, restaurants, museums, hospitals, historical sites in a specific geographic area, houses for sale, etc. A POI may also correspond to a movie theater showing a particular film, a restaurants that serve a specific type of food, such as pizza, etc.

A user may search for specific POIs that the user wants to locate by entering information for a query. A search results for identified POIs may be provided to a user based on the query. The search results may be within either sharp search boundaries set by an arbitrary radius (e.g., 1 mile, 5 miles, 10 miles, etc.) from a location, a geographic region (e.g., neighborhood, city, etc.) defined by a polygon, or an arbitrary polygon (e.g., square, etc.) surrounding a location. As a result, POIs that are outside a sharp search boundary are not provided to the user. In addition, a user is denied the opportunity to consider POIs that might better fit the user's preferences (based on the query), but are right outside the sharp search boundaries. At the same time, when a user expands the geographic scope of search results, a user is often provided with a search result that is crowded by too many POIs that are unappealing to the user. Also, a search within an expanded scope is very inefficient, and requires use of additional resources.

In view of the foregoing, there is a need for improved techniques for performing geographic searching for users. Preferably, such techniques should be more efficient, while also providing relevant or useful search results in comparison to that provided by conventional methods. Moreover, there is a need for improved methods and systems for providing search results of relevant POIs in response to a query from a user, that are not necessarily limited to sharp search boundaries or other geo-spatial limitations.

The herein disclosed embodiments are directed to achieving one or more of the above-referenced goals, by providing computer-implemented methods and systems for using spatial indexing for providing search results of, for example, POIs to a user.

SUMMARY

In one exemplary embodiment, the present disclosure is directed to a computer-implemented method for processing a query for points of interest (POIs) using a hierarchical grid structure representing a geographic area. The method may include, for example, receiving a query for POIs from a user workstation; defining a query footprint for the query based on a location corresponding to the query and the hierarchical grid structure, wherein the query footprint comprises query spatial identifiers over one or more of a plurality of levels of the hierarchical grid structure; matching the query spatial identifiers with one or more POI spatial identifiers in a plurality of indexes for the hierarchical grid structure; calculating scores based on the results of matching; and providing a list representing one or more POIs to the user workstation based on the scores.

In another exemplary embodiment, the present disclosure is directed to a computer-implemented method for processing a query for points of interest (POIs) using a hierarchical grid structure representing a geographic area. The method may include, for example, receiving a query for POIs from a user workstation; defining query footprint for the query based on a location corresponding to the query, wherein the query footprint comprises query spatial identifiers for a plurality of levels of the hierarchical grid structure; matching the query spatial identifiers with one or more POI spatial identifiers organized into a plurality of indexes, wherein each one of the plurality of indexes comprises an index of the POI spatial identifiers for one of the plurality of levels; and providing, to the user workstation, an output specifying one or more POIs corresponding to the matched POI spatial identifiers.

In still a further embodiment, the present disclosure is directed to a system for processing a query for points of interest (POIs) using a hierarchical grid structure representing a geographic area. The system may include, for example, a storage configured to store a plurality of indexes, wherein each one of the indexes comprises an index of POI spatial identifiers for a plurality of levels of the hierarchical grid structure; and a processor configured to: receive a query from a user workstation; define a query footprint for the query based on a location corresponding to the query, wherein the query footprint comprises query spatial identifiers for one or more of the plurality of levels; perform matching between the query spatial identifiers and the POI spatial identifiers in one or more of the plurality of indexes; and provide an output representing one or more matched POIs corresponding to the matched POI spatial identifiers.

Additional objects and advantages will be set forth in part in the description which follows, and in part will be obvious from the description, or may be learned by practice of the embodiments of the invention. For example, the objects and advantages may be realized and attained by means of the elements and combinations particularly pointed out in the appended claims.

It is to be understood that both the foregoing general description and the following detailed description are exemplary and explanatory only and are not restrictive of embodiments thereof, as claimed.

BRIEF DESCRIPTION OF THE DRAWINGS

The accompanying drawings, which are incorporated in and constitute a part of this disclosure, illustrate several embodiments and aspects of the present disclosure, and together with the description, serve to explain certain principles of the invention. In the drawings:

FIG. 4 illustrates exemplary indexes of POI spatial identifiers, consistent with certain disclosed embodiments of the present disclosure;

DESCRIPTION OF THE EMBODIMENTS

Figure 1:
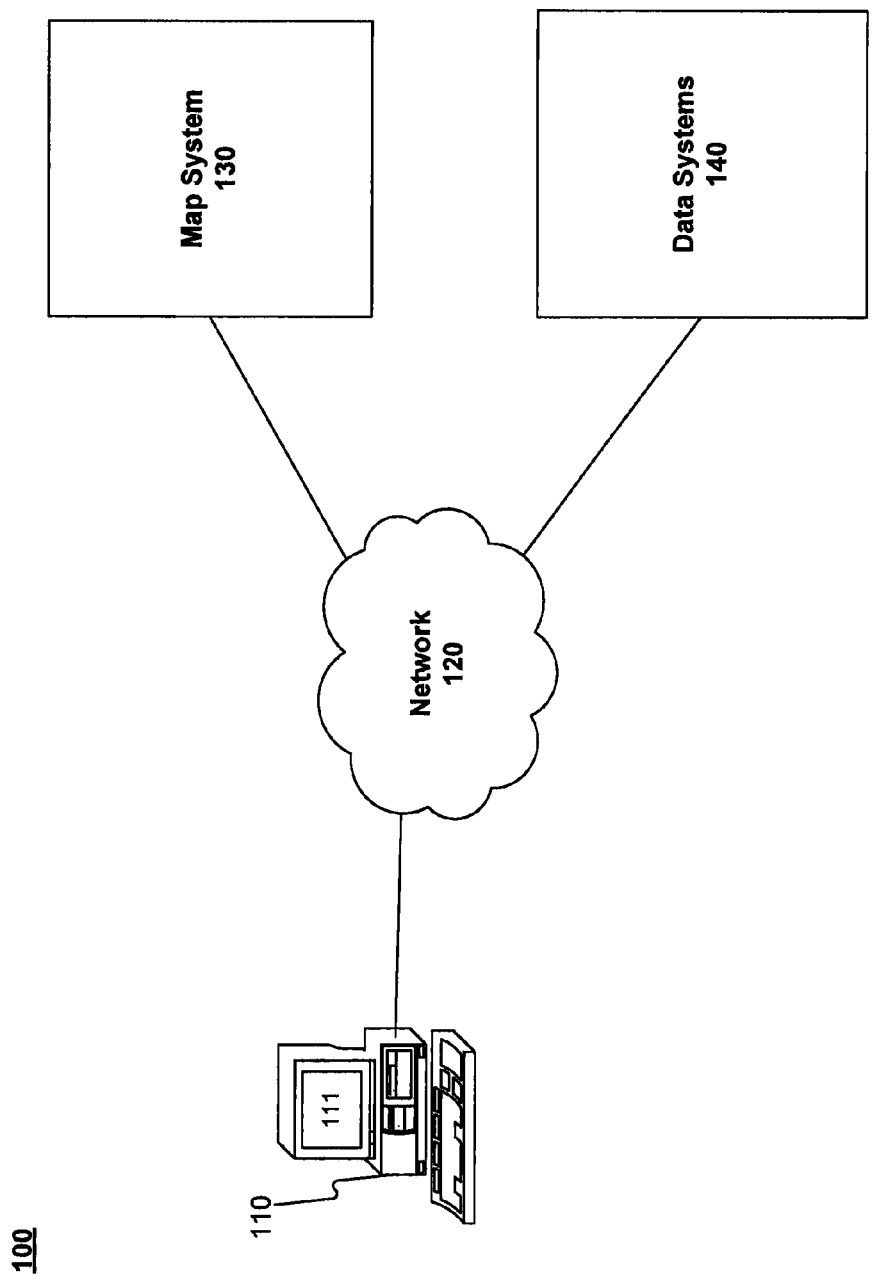
FIG. 1 is a block diagram illustrating an exemplary environment, consistent with certain disclosed embodiments of the present disclosure.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the disclosed embodiments. For example, substitutions, additions, or modifications may be made to the components illustrated in the drawings, and the exemplary methods described herein may be modified by substituting, reordering, or adding steps to the disclosed methods. Accordingly, the following detailed description does not limit the embodiments. Instead, the proper scope is defined by the appended claims.

FIG. 1 illustrates an exemplary environment 100 for implementing methods and systems consistent with certain embodiments of the present disclosure. Environment 100 may include one or more of the following components: a user workstation 110, a map system 130, and data systems 140. Each one of user workstation 110, map system 130, and data systems 140 may be disposed in communication with a network 120 and include at least one processor (e.g., a central processing unit ("CPU")), a memory, a modem, an input device (e.g., keyboard, mouse, etc.), an output device (e.g., monitor), and at least one of internal storage (e.g., hard drive) and/or external storage (e.g., database on external servers, disk, flash memory, etc.). Network 120 may be any combination of networks, for example, an intranet or private network, and/or the Internet. Any combination of user workstation 110, map system 130, and data systems 140 may be operated by one or more users/operators on one or more systems.

User workstation 110 may be, for example, a personal computer, a laptop, a handheld computer, a personal digital assistant ("PDA"), a mobile telephone device, a smart phone, a personal media player, a navigation system, an automotive navigation system (e.g., automobile GPS units), etc. A user at user workstation 110 may access map-related services provided by map system 130. The user may interact with map system 130 through a portal (e.g., website) provided by map system 130 and displayed on a display 111 of user workstation 110. Through display 111, the user may specify information to request a list of POIs near a geographic location. For example, the user may enter information to request a list of gas stations or restaurants in a city or town, or near a specific address (e.g., 1100 Pennsylvania Ave., Washington, D.C.).

The type of POIs that a user may specify include, for example, a business listing (e.g., store, gas station, rest stop, movie theater, hotel), a public facility (e.g., police station, hospital, airport, museum, national park), a property for sale or rent (e.g., an automobile, a house, an apartment, etc. that is for sale or rent), moving entity (e.g., tracked car, tracked person), etc. The information entered by the user may also include indications of specific preferences. For example, the user may enter a preference of POIs that correspond to restaurants that serve "Pizza", are moderately priced, are within a walking distance from the geographic location, are family friendly, etc. The user may specify the geographic location through user workstation 110, such as through data entered by a keyboard and/or a location selected with a mouse based on a map on display 111. The geographic location may be a specific address, a name of a geographic entity (e.g., neighborhood, city, state), or a point on a map selected by the user. In one embodiment, the user may select a location by clicking on an interactive map provided by map system 130 to user workstation 110 and displayed in display 111. In an alternative embodiment, map system 130 or user workstation 110 may automatically specify/recognize the geographic location based on the location of user workstation 110, previous preferences set by the user, an area of map displayed to the user in display 111, etc. User workstation 110 may generate a query based on the preference information and the geographic location. User workstation 110 may transmit the query to map system 130 via network 120.

Data systems 140 may represent one or more servers or computer systems that are operated by one or more operators (e.g., yellow pages, mapping companies, Zagat, tracking services, etc.) that provide data about different POIs that are of possible interest to a user. Each one of data systems 140 and map system 130 may include a personal computer, a single server (or a component thereof), multiple servers arranged as part of an integrated or distributed system, a server farm, a network of servers, etc. Data systems 140 may collect and store data about different POIs. Data systems 140 may organize information about POIs into separate documents (i.e., each document may represent an individual POI). Hereinafter, POI information and document may be used interchangeably to mean information corresponding to a POI.

To collect information on POIs, map system 130 may transmit, via network 120, a request to each one of data systems 140 for updated and/or new documents. Map system 130 may transmit requests to data systems 140 on a periodic basis. Map system 130 may receive updated and/or new documents from data systems 140 in response to the requests. Alternatively, data systems 140 may transmit updated and/or new documents independently (without being prompted to by requests from map system 130) on a periodic basis or whenever a determination is made that updated and/or new documents should be transmitted to map system 130. In an alternative embodiment, data systems 140 may provide data to map system 130, and map system 130 may organize the data into individual documents corresponding to POIs.

Map system 130 may define a POI footprint for each POI over a plurality of spatial levels in a multiple-level hierarchical grid that recursively divides a geographic region. A grid, such as that depicted in the exemplary embodiment of FIG. 2, may recursively define a geographic area represented by the grid. Each level of the grid may further divide a portion of geography included in a previous level. In an implementation of a hierarchy of grids, the lowest level may include four quadrants and each successive level includes four grids, each grid including four quadrants. The portion of geography that is included in each quadrant of each successive level decreases, as does the portion of geography included in each grid of each successive level.

Consistent with certain embodiments, the hierarchical grid may be a quadtree structure. Spatial levels are grids of different sizes in a quadtree structure. Each level of a quadtree structure indicates a grid that is a quarter of the area of the parent level. Map system 130 may store the quadtree structure as a raster bitmap, for example. Consistent with certain embodiments, each POI footprint may include POI spatial identifiers. A spatial identifier may indicate, for example, a single grid within a quadtree and a level of the grid within the quadtree. The POI spatial identifiers may represent identifiers within the quadtree representing the POI footprint. In certain embodiments, each POI spatial identifier may include a level indicator and a quadrant indicator. The quadrant indicator may equal one of four values (e.g., 1-4). Each one of the quadrant indicator values may represent a different quadrant of any level. For example, quadrant indicator 1 may represent the upper-left quadrant of a level. The quadrant values may increase in the clockwise direction of the quadrants. (In accordance with certain embodiments of the present disclosure, quadrant indicator may equal zero in the lower-left quadrant of a level and increase in the counter-clockwise direction of the quadrants to value of 3.) The lowest level (e.g., 0) may represent the largest area (e.g., the entire map of the world). The next higher level (e.g., 1) may represent an area that is a quadrant of the next lower level (e.g., 0). Map system 130 may determine the scope of the lowest level (how large of an area the lowest level covers) based on various factors, including population information, geocode information, and/or other predetermined information (e.g., ease of travel within a geographic area), etc.

To define POI spatial identifiers, map system 130 may first determine an address associated with a document. The address may represent a latitude and a longitude of where an entity (POI) represented by the document is located. Map system 130 may determine a significance of the entity based on information in the document. For example, an entity such as Grand Canyon may have a high (global) significance, and a local gas station may have a low (localized) significance. A high significance may mean that the entity should be identified on a wide geographic scope, and a low significance may mean that the entity has a localized scope. The higher the significance, map system 130 may define the POI footprint for a greater number of levels. For example, map system 130 may define the POI footprint for three levels (levels 0-2) for a document representing the Grand Canyon. Alternatively, map system 130 may define the POI footprint for only one level (level 2) for a document representing a local gas station or restaurant.

After map system 130 defines POI footprint for each one of the documents, map system 130 may create multiple indexes based on the POI spatial identifiers of the documents. Each one of the multiple indexes may represent POI spatial identifiers on a different one of the spatial levels.

In accordance with certain embodiments of the present disclosure, map system 130 may receive a query from user workstation 110. The query may include information specifying a geographic location and preferences describing POIs that a user at user workstation 110 wants to receive in a list to be displayed on display 111. Map system 130 may determine a latitude and a longitude of the geographic location specified by the query. Map system 130 may run the latitude and the longitude for the geographic location of the query through a predefined algorithm to define a query footprint for the query. Map system 130 may determine what levels the query footprint should be defined for based on the scope of the search. For example, if the scope of the search is the widest possible scope, then the query footprint should be defined for all levels. In contrast, if the scope of the search is the narrowest scope, then it should be defined just for the highest level.

Consistent with certain embodiments, a query footprint may include query spatial identifiers. Each query spatial identifier may include a level indicator and a quadrant indicator. Map system 130 may perform matching between the query spatial identifiers and the POI spatial identifiers using the multiple indexes created for the different documents. Map system 130 may select one or more indexes of the POI spatial identifiers for the levels that the query footprint is defined for. Map system 130 may determine an index for the certain level, and compare the one of the query spatial identifiers with the POI spatial identifiers within the index. Map system 130 may determine whether one of the query spatial identifiers at a certain level has a match with one of the POI spatial identifiers in one of the one or more indexes for the certain level.

After the matches are determined between the query spatial identifiers and the POI spatial identifiers, map system 130 may calculate a score for each match. By way of example, map system 130 may first determine a relevance score for each one of the matches by comparing the preferences of the user provided in the query with the description of a POI in a matched document. Map system 130 may assign a different weight to each spatial level. Additionally, map system 130 may calculate the score for each match based on the distance between the geographic location and the location of the document specified in the matched document, the weight of the level on which the query spatial identifier and the POI spatial identifier match, and the relevance score.

Map system 130 may rank the matches based on the scores and generate a list representing POIs matched for query based on the rank. Map system 130 may transmit the list to user workstation 110. User workstation 110 may output POIs represented by the list on display 111. User workstation 110 may also indicate the location of each one of the POIs on a map in display 111.

Figure 2:
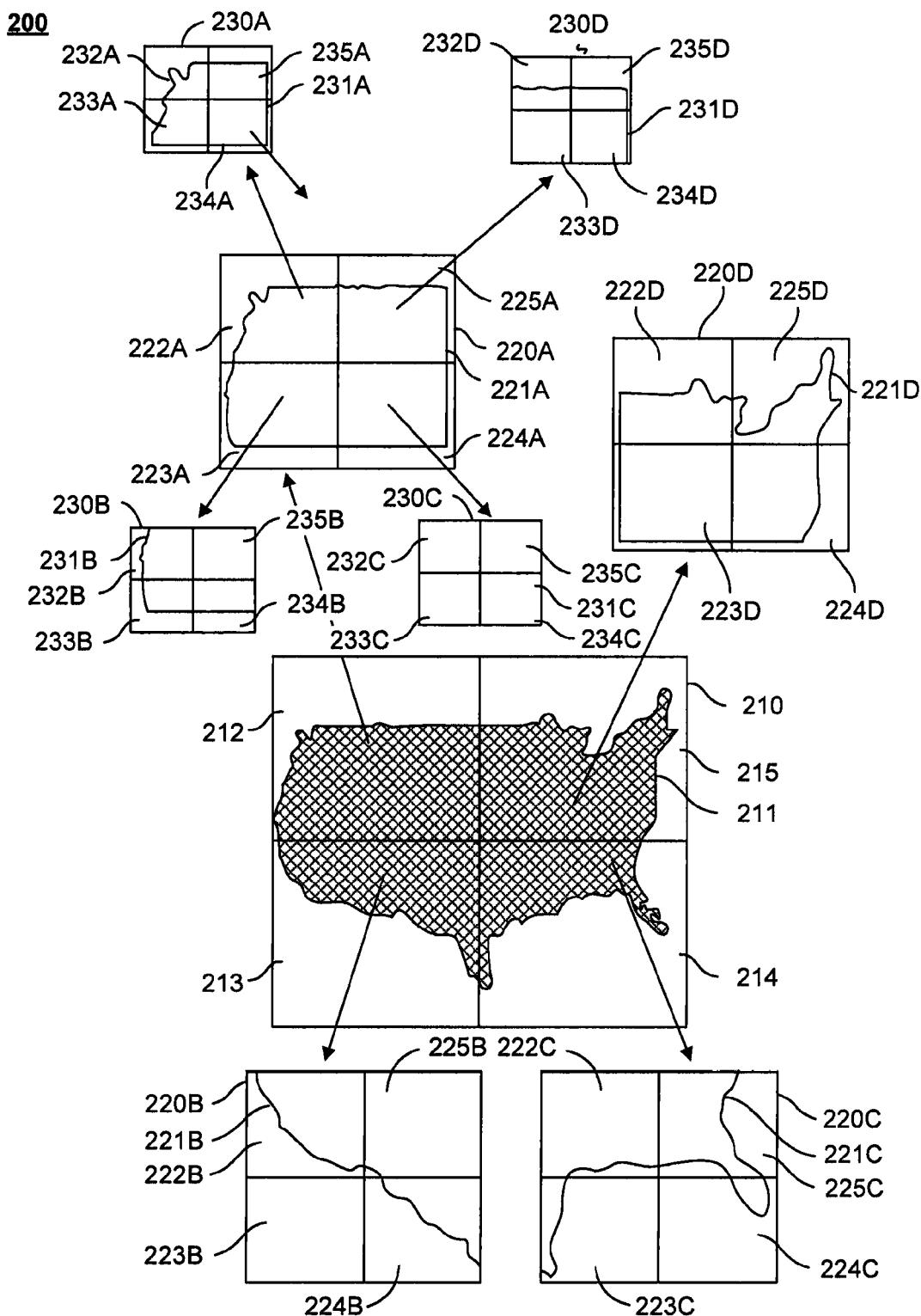
FIG. 2 is a diagram depicting an exemplary multiple-level hierarchical grid that may be used in connection with certain disclosed embodiments of the present disclosure.

FIG. 2 is a diagram depicting an example of a quadrant multiple-level hierarchical grid 200 that recursively divides a geographic region. As shown in FIG. 2, quadrant grid 200 has multiple spatial levels 210, 220, 230, with each level being based on a quadrant of a lower level. The lowest level (level 0) of grid 210 includes a region of geography 211 (in the example of FIG. 2, the continental United States other than the state of Alaska) and four quadrants 212, 213, 214, and 215. Each quadrant 212, 213, 214 or 215 includes a portion of the region of geography 211.

Quadrant 212 corresponds to a grid 220A in the second-lowest level (level 1) of grid. Grid 220A includes a region of geography 221A (e.g., the Northwest portion of the continental United States) that corresponds to the portion of geography included in quadrant 212 of grid 210. Grid 220A also includes four quadrants 222A, 223A, 224A and 225A. Each quadrant 222A, 223A, 224A or 225A includes a portion of the region of geography 221A. Similarly, quadrant 213 corresponds to a grid 220B in the second-lowest level of grid hierarchy 200. Grid 220B includes a region of geography 221B (e.g., the Southwest portion of the continental United States) that corresponds to the portion of geography included in quadrant 213 of lowest-level grid 210. The second-lowest level grid 220B also includes four quadrants 222B, 223B, 224B and 225B. Each quadrant 222B, 223B, 224B or 225B includes a portion of the region of geography 221B.

In the same manner, quadrant 214 corresponds to a grid 220C in the second-lowest level of grid hierarchy 200. Grid 220C includes a region of geography 221C (e.g., the Southeast portion of the continental United States) that corresponds to the portion of geography included in quadrant 214 of lowest level grid 210. The second-lowest level grid 220C also includes four quadrants 222C, 223C, 224C and 225C. Each quadrant 222C, 223C, 224C or 225C includes a portion of the region of geography 221C.

In the same manner, quadrant 215 corresponds to a grid 220D in the second-lowest level of grid hierarchy 200. Grid 220D includes a region of geography 221D (e.g., the Northeast portion of the continental United States in FIG. 2) that corresponds to the portion of geography included in quadrant 215 of lowest-level grid 210. Second-lowest level grid 220D also includes four quadrants 222D, 223D, 224D and 225D. Each quadrant 222D, 223D, 224D or 225D includes a portion of the region of geography 221D.

In this manner, each quadrant 212, 213, 214 or 215 of lowest-level grid 210 corresponds to one of four grids 220A, 220B, 220C or 220D, in the second-lowest level of grid hierarchy 200. Each quadrant 222A, 223A, 224A, 225A, 222B, 223B, 224B, 225B, 222C, 223C, 224C, 225C, 222D, 223D, 224D or 225D of each grid 220A, 220B, 220C or 220D of the second-lowest level of the grid hierarchy 200 also corresponds to a grid in the third-lowest level of grid hierarchy 200. For brevity, only the four grids 230A, 230B, 230C and 230D of one of the second-lowest level grids (specifically, grid 220A) are shown in FIG. 2. The four grids of the second-level grid 220B are not shown. Similarly, the four grids of the second-lowest level grids 220C and 220D are not shown.

Quadrant 222A corresponds to a grid 230A in the third-lowest level of grid hierarchy 200. Grid 230A includes a region of geography 231A that corresponds to the portion of geography included in quadrant 222A of second-lowest level grid 220A. The third-lowest level grid 230A also includes four quadrants 232A, 233A, 234A and 235A, each quadrant 232A, 233A, 234A or 235A including a portion of region of geography 231A.

Similarly, quadrant 223A corresponds to a grid 230B in the third-lowest level of the grid hierarchy 200. The grid 230B includes a region of geography 2311B that corresponds to the portion of geography included in quadrant 223A of second-lowest level grid 220A. Third-lowest level grid 230B also includes four quadrants 232B, 233B, 234B and 235B. Each quadrant 232B, 233B, 234B or 235B includes a portion of region of geography 231B.

In the same manner, quadrant 224A corresponds to a grid 230C in the third-lowest level of grid hierarchy 200. Grid 230C includes a region of geography 231C that corresponds to the portion of geography included in quadrant 224A of second-lowest level grid 220A. Third-lowest level grid 230C also includes four quadrants 232C, 233C, 234C and 235C. Each quadrant 232C, 233C, 234C or 235C includes a portion of region of geography 231C.

In the same manner, quadrant 221A corresponds to a grid 230D in the third-level of the grid hierarchy 200. Grid 230D includes a region of geography 231D that corresponds to the portion of geography included in quadrant 221A of second-lowest level grid 220A. Third-lowest level grid 230D also includes four quadrants 232D, 233D, 234D and 235D. Each quadrant 232D, 233D, 234D or 235D includes a portion of the region of geography 231D. In this manner, each quadrant 222A, 222B, 222C or 222D of second-lowest level grid 220A corresponds to one of four grids, 230A, 230B, 230C or 230D, in third-lowest level of grid hierarchy 200. Each quadrant 232A, 233A, 234A, 235A, 232B, 233B, 234B, 235B, 232C, 233C, 234C, 235C, 232D, 233D, 234D or 235D of each grid 230A, 230B, 230C or 230D of third-lowest level of grid hierarchy 200 may also corresponds to a grid in fourth-level of the grid hierarchy 200.

Figure 3:
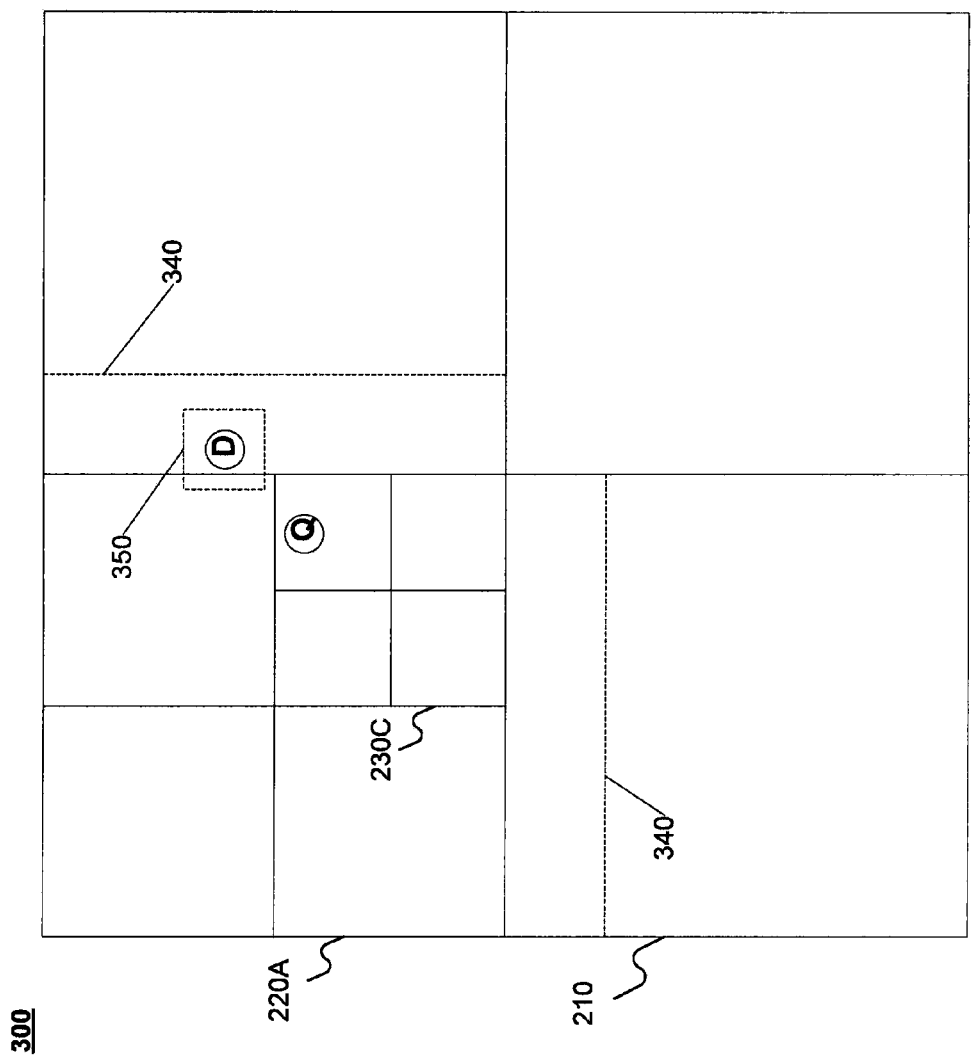
FIG. 3 illustrates an exemplary quadtree structure and examples of a POI footprint and a query footprint, consistent with certain disclosed embodiments of the present disclosure.

FIG. 3 is a diagram depicting an exemplary quadtree 300 that map system 130 may use to define POI footprints and query footprints, consistent with certain embodiments of the present disclosure. Quadtree 300 may be a type of hierarchical grid, such as grid 200 illustrated in FIG. 2. Quadtree 300 may include level 210 corresponding to the lowest level (e.g., level 0), level 220A corresponding to second-lowest level (e.g., level 1), and level corresponding to third-lowest level 230 (e.g., level 2). Level 210 may be the lowest level (e.g., level 0), and may include all of the area of quadtree 300. Level 220 may be the second-lowest level (e.g., level 1), and may be the area of the upper-left quadrant (e.g., quadrant 1) of level 0 (area 212 in FIG. 2). Level 230 may be the third-lowest level (e.g., level 2) illustrated of quadtree 300, and may be the area of the lower-right quadrant (e.g., quadrant 3) of level 1 (area 224A in FIG. 2).

Point D may represent a location of a POI associated with one of the multiple documents ("document D") received by map system 130 from data systems 140. Map system 130 may define a POI footprint for document D. If, for example, the POI represented by document D may has the highest significance, a spatial identifier may be defined at the lowest possible level. The spatial footprint for document D may include, for example, the following POI spatial identifier at the lowest level: level 0, quadrant 2.

In certain embodiments, map system 130 may also determine whether point D is within a buffer region around another one of the quadrants within a level. For example, the buffer region may be extend a predetermined distance from the quadrant. In FIG. 3, lines 340 may represent the borders of the buffer region of quadrant 1 of level 0. Map system 130 may determine that point D is within the buffer region defined by borders 340 of a quadrant represented by level 0, quadrant 1. As a result, the spatial footprint for document D may also include an additional spatial identifier at the lowest level: level 0, quadrant 1.

In still further embodiments, map system 130 may determine additional POI spatial identifiers for document D if a buffer 350 around point D is within different quadrant(s) from point D at the different levels. Buffer 350 may be a predetermined shape or polygonal area around point D. For example, in FIG. 3, buffer 350 is within level 0, quadrant 1 and level 1, quadrant 2, in addition to being within level 0, quadrant 2. As a result, map system 130 may include a spatial identifier for level 0, quadrant 1 and a POI spatial identifier for level 1, quadrant 2 in the POI footprint for document D.

In FIG. 3, point Q may represent a location associated with a query received by map system 130 from user workstation 110. Map system 130 may define a query footprint for the query. The query footprint (based on point Q) may include the following query spatial identifiers: level 0, quadrant 1; level 1, quadrant 3; level 2, quadrant 1. In certain embodiments, map system 130 may also include additional query spatial identifiers in the query footprint based on buffer regions around quadrant(s), buffer(s) around point Q, or both in an analogous manner described above for defining POI spatial identifiers for document D.

FIG. 4 provides examples of multiple indexes 400 of POI spatial identifiers, consistent with certain embodiments of the present disclosure. The indexes 400 may be created and stored by map system 130 for POIs D, C, B, A, and E, for example. Points D, C, B, A, E may represent POIs D, C, B, A, and E in hierarchical grid structure. Information, including positions, for POIs D, C, B, and A may be provided in documents D, C, B, and A. Point D illustrated in FIG. 3 may correspond to the point D referred to in FIG. 4. Multiple indexes 400 may include an index 410 and index 420 for level 0, an index 430 for level 1, and an index 440 for level 2. One or more indexes may represent a single level of a quadtree. Indexes for the same level may include different POI spatial identifiers or some of the same POI spatial identifiers organized in different ways. Each index may include one or more POI spatial identifiers for one of the points.

For example, index 410 and index 420 are both for level 0, and therefore include only POI spatial identifiers that correspond to level 0. Index 410 may include POI spatial identifiers for points D, C, B, and A. Index 410 may include two POI spatial identifiers for point D: level 0, quadrant 1 and level 0, quadrant 2. Index 410 may also include a POI spatial identifier for point C: level 0, quadrant 1; a POI spatial identifier for point B: level 0, quadrant 4; a POI spatial identifier for point A: level 0, quadrant 4, etc. Index 420 may include only POI spatial identifiers for points D and C of those that are in index 410 (only in quadrant 1 and quadrant 2 of level 0).

Index 430 may include POI spatial identifiers corresponding to level 1. Index 430 may include a POI spatial identifier for point D: level 1, quadrant 2 and POI spatial identifiers for point C: level 1, quadrant 3 and level 1, quadrant 1. Index 440 may include POI spatial identifiers corresponding to level 2. Index 440 may include a POI spatial identifier for point C: level 2, quadrant 2 and a POI spatial identifier for point E: level 2, quadrant 1.

A POI footprint, for example, for point D may include POI spatial identifiers level 0, quadrant 1; level 0, quadrant 2; and level 1, quadrant 2 in indexes 410, 420, and 430. While a POI footprint for point E may include only the POI spatial identifier level 2, quadrant 1 in index 440.

Figure 5:
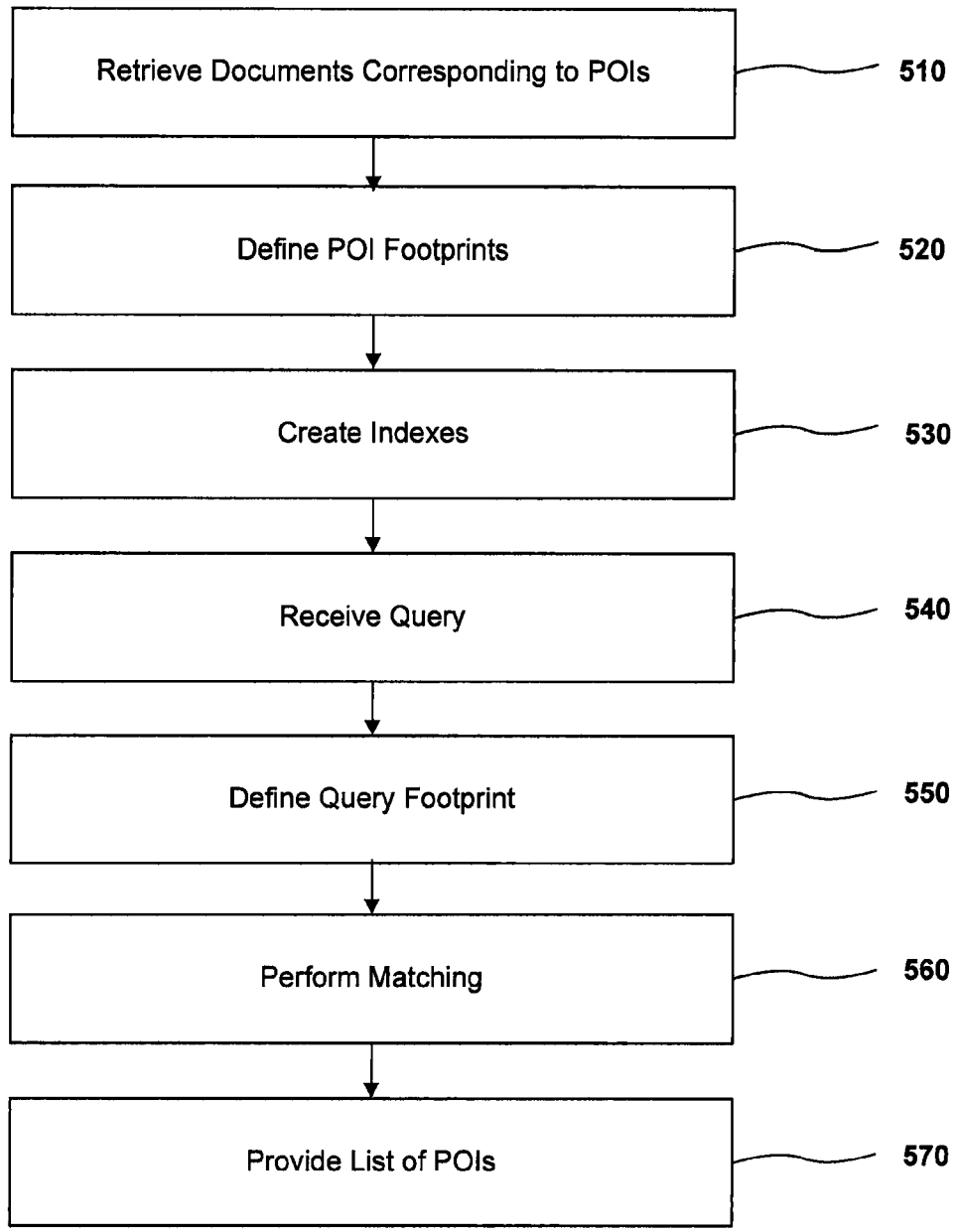
FIG. 5 is a flowchart of an exemplary method, consistent with certain disclosed embodiments of the present disclosure.

FIG. 5 depicts a flowchart of an exemplary method 500 for creating multiple indexes of POI spatial identifiers and providing a list representing matched documents to a user workstation based on a query, consistent with certain embodiments of the present disclosure. Method 500 may be executed using the components of environment 100 illustrated in FIG. 1. Method 500 may use, for example, quadtree structure 300 illustrated in FIG. 3. Method 500 may create and store, for example, multiple indexes 400 illustrated in FIG. 4.

As illustrated in FIG. 5, at step 410, map system 130 may retrieve documents corresponding to POIs. As noted above, each one of the documents may correspond to a POI. Map system 140 may retrieve the documents from internal storage or by receiving the documents from data systems 140.

At step 520, map system 130 may define a POI footprint for each one of the POIs. At step 530, map system 130 may create multiple indexes based on POI spatial identifiers included in the POI footprints defined for the POIs. Map system 130 may create one or more indexes for each individual spatial level. Each index for an individual spatial level may include POI spatial identifiers that are all on the same level. An index may include spatial identifiers corresponding to different POIs.

At step 540, map system 130 may receive a query from a user at user workstation 110. The query may include location information and/or preferences that describe POIs desired by the user. Map system 140 may determine a latitude and a longitude based on the location information. For example, if the location information specifies a name of a city, the latitude and the longitude may correspond to a geographic center of the city or to a pre-set geographic location in the city (e.g., bus station, center square, center of most densely populated/popular neighborhood, etc.). Map system 140 may determine which spatial levels will be searched based on the preferences and/or preciseness of the location information. For example, if the preferences describe that a user wants a list of gas stations (localized search), only the highest level may be searched if there are gas stations within the highest level. In contrast, for example, if the preferences describe that a user wants a list of major national parks (global search), all the levels may be searched.

At step 550, map system 130 may define a query footprint over one or more of the spatial levels for the query based on a latitude and a longitude determined for the location information in the query. At step 560, map system 130 may perform a matching between the query spatial identifiers included in the query footprint and the POI spatial identifiers within the multiple indexes. Consistent with certain embodiments, matching may include accessing and/or selecting only indexes for specific levels. At step 560, map system 130 may provide a list of one or more POIs representing one or more documents based on the matching at step 550. Map system 140 may provide the list to user workstation 110. User workstation 110 may present the list to the user on display 111.

Figure 6:
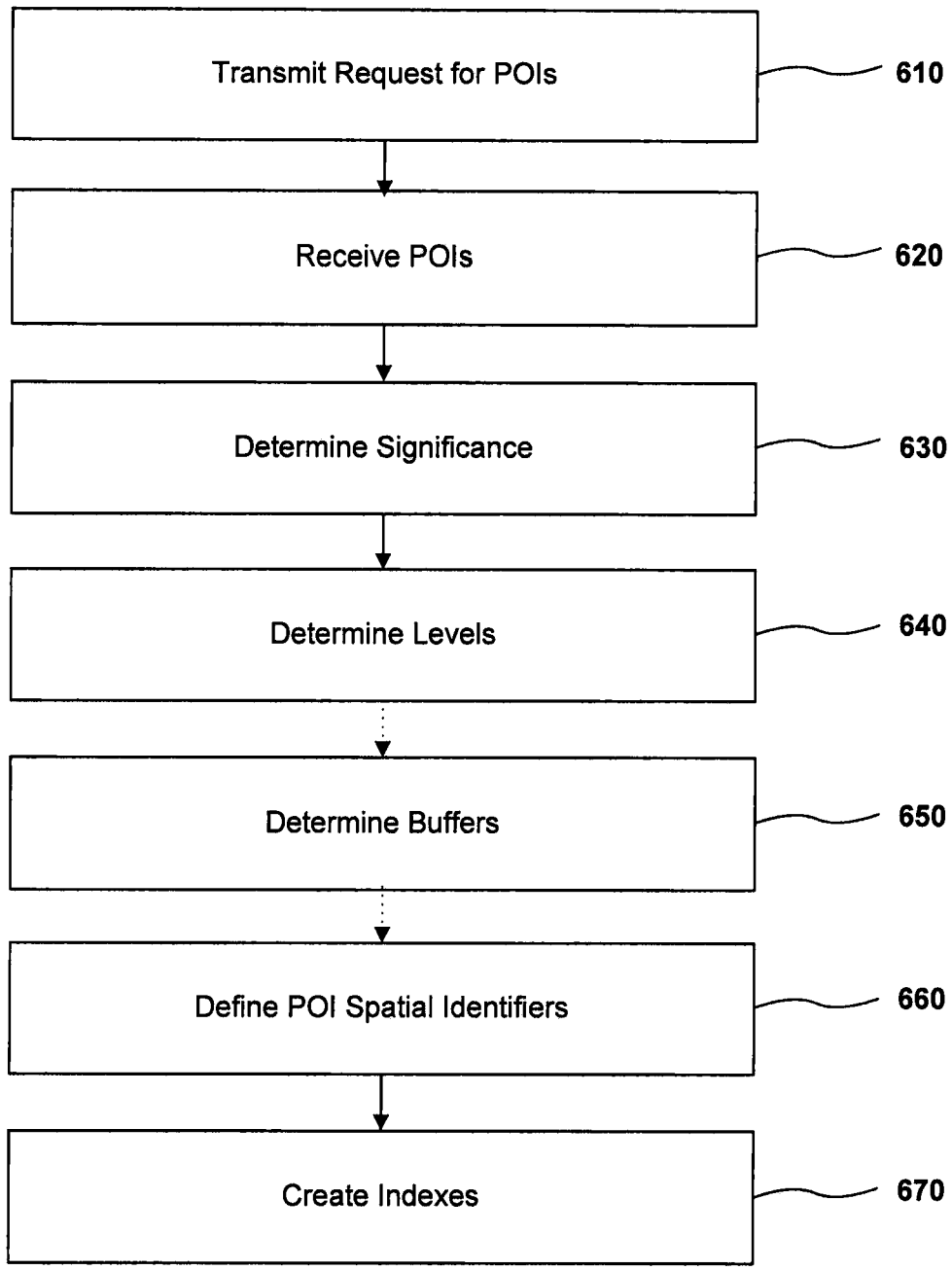
FIG. 6 is a flowchart of an exemplary method for creating indexes of POI spatial identifiers, consistent with certain disclosed embodiments of the present disclosure.

FIG. 6 depicts a flowchart of an exemplary method 600 for creating multiple indexes of POI spatial identifiers, consistent with certain embodiments of the present disclosure. Method 600 may be executed by map system 130 of FIG. 1. Method 600 may created multiple indexes like those presented in FIG. 4. Steps 610 and 620 of method 600 may correspond to step 510 of method 500, and steps 630, 640, 650, and 660 of method 600 may correspond to step 520 of method 600.

As illustrated in FIG. 6, at step 610, map system 130 may transmit one or more requests for documents to data systems 140. Step 610 may occur periodically. At step 620, map system 130 may receive new and/or updated documents from data systems 140 in response to the requests. Each one of the documents may correspond to a POI. A document may include information describing, for example, the POI and location information about where the POI is located. The information describing the POI may include information that denotes a significance of the POI.

At step 630, map system 130 may determine the significance of each one of the POIs represented by the documents. Map system 130 may determine that a POI has a high significance when information denotes, for example, that a type of place like the POI would be of interest to a user over a wider geographic scope. At step 660, map system 130 may determine for which spatial levels a POI footprint will be defined for a document based on the significance of the POI represented by the document. For example, when a POI has the highest possible significance, map system 130 may define a POI footprint for all possible spatial levels, starting with the lowest level. When a POI has the lowest possible significance (e.g., limited or localized relevance only), map system 130 may define a POI footprint for only the highest level.

Optionally, at step 650, map system 130 may determine a buffer for each one of the POIs represented by a document. Map system 130 may determine a latitude and a longitude for an individual POI represented by a document based on the location information in the document. Map system 130 may determine a buffer for an area around a point at the intersection at an intersection of the latitude and the longitude corresponding to a document. As will be appreciated, map system 130 may not perform step 650 as part of method 600. Map system 130 may perform step 660 after performing step 640 (i.e., map system 130 may define POI spatial identifiers of a POI footprint only based on the actual location of a POI, not a buffer around the POI).

At step 660, map system 130 may define a POI footprint for each one of the documents by defining POI spatial identifiers for each one of the documents. Map system 130 may define POI spatial identifiers for a document at each spatial level determined at step 640. Map system 130 may define POI spatial identifiers at a single level for the document by determining what quadrants of the level either the location corresponding to the document or a buffer of the location is within. For example, with reference to FIG. 3, map system 130 may determine that a location of a document identified by point D is within quadrant 2 of level 0, and define spatial identifier level 0, quadrant 2 for spatial level 0 of the POI footprint of the document. Alternatively, map system 130 may determine that buffer 350 of point D is within quadrants 1 and 2 of level 0, and define POI spatial identifier level 0, quadrant 1 and POI spatial identifier level 0, quadrant 2 for spatial level 0 of the POI footprint for the document corresponding to point D.

At step 670, map system 130 may create and store multiple indexes based on the POI spatial identifiers defined at step 660 for each one of the documents. Map system 130 may create indexes, where each index includes POI spatial identifiers only for a single level. Each index may include a plurality of spatial identifiers and indicators of the documents corresponding to each one of the spatial identifiers. Map system 130 may use the multiple indexes to determine specific POIs near a location specified in a query.

Figure 7:
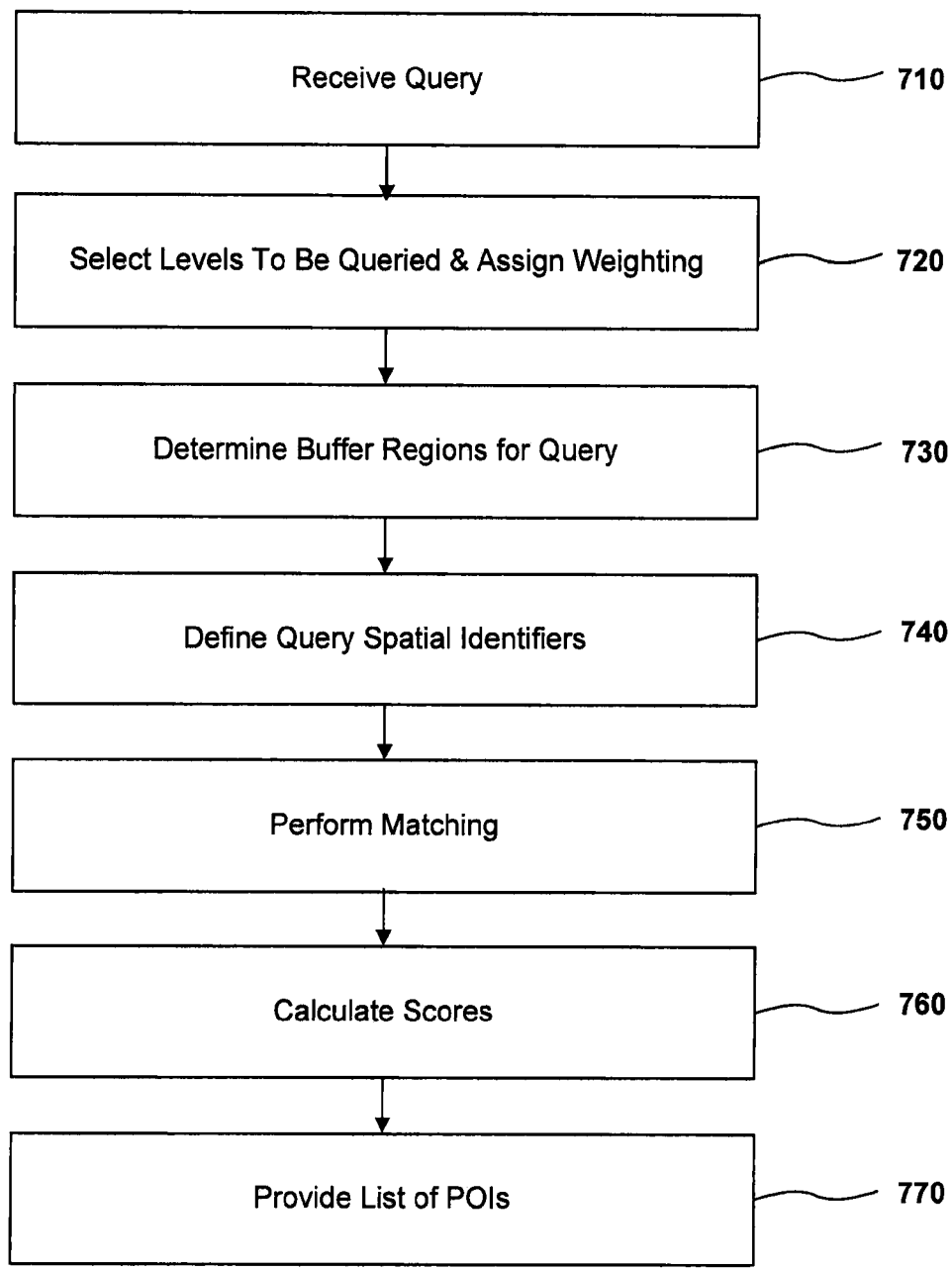
FIG. 7 is a flowchart of an exemplary method for providing a list of POIs for a query, consistent with certain disclosed embodiments of the present disclosure.

FIG. 7 is a flowchart of an exemplary method 700, consistent with certain embodiments, for providing a list of POIs near a location specified in a query, based on the preferences in the query. Method 700 may be executed by map system 130 of FIG. 1. Steps 720, 730, and 740 of method 700 may correspond to step 550 of method 500. Method 700 may occur after step 670 of method 600.

As illustrated in FIG. 7, at step 710, map system 130 may receive a query from user workstation 110. The query may include location information and/or preferences that describe POIs desired to be viewed by a user at user workstation 110. Map system 130 may determine a latitude and a longitude based on the location information.

At step 720, map system 130 may select what spatial levels will be queried for relevant POIs and assign a different weight to each one of the spatial levels based on the location information, preferences described, and/or information about the area surrounding a point of intersection of the latitude and the longitude. The information about the surrounding area may include population density, type of area (e.g., urban, rural, suburban, etc.), ease of travel, etc. The preferences may provide additional information regarding the appropriate geographic scope for searching for POIs. Map system 130 may select a greater number of levels to be queried the wider the appropriate geographic scope for the search. The spatial levels selected to be queried may also be the spatial levels for which a query footprint is defined for the query. Map system 130 may assign a weight for each level based on the importance of the scope, an indication regarding distances provided in the preferences of the query, etc.

Alternatively, or additionally, at step 720, map system 130 may select what spatial levels will be queried based on the preciseness of the location information provided in the query. For a precise location (e.g., an address point: 300 Granite Run Dr., Lancaster, Pa.) map system 130 may select more spatial levels than for a less precise location (e.g. a neighborhood: Foggy Bottom; a city: Washington, D.C.). Map system 130 may also assign weights to each one of the selected spatial levels based on the preciseness of the location information in the query.

For example, for an address point, map system 130 may select levels 0-15 to be searched and map system 130 may assign weights that weigh the higher levels more heavily and weights may drop off rapidly as the levels decrease. However, map system 130 may assign the highest weight to the lowest level since only the most significant POIs (e.g., Grand Canyon) have corresponding POI spatial identifiers at the lowest level. The following Table I provides examples of weights that map system 130 may assign for each level when the location information of a query provides an address point as follows:

TABLE I

| Level | Weight Assigned |
|---|---|
| 15 | 25.0 |
| 14 | 20.0 |
| 13 | 15.0 |
| 12 | 10.0 |
| 11 | 8.0 |
| 10 | 6.0 |
| 9 | 4.0 |
| 8 | 2.0 |
| 7 | 1.0 |
| 6 | 0.8 |
| 5 | 0.6 |
| 4 | 0.4 |
| 3 | 0.3 |
| 2 | 0.2 |
| 1 | 0.1 |
| 0 | 50.0 |

For a less precise location, for example, like a city, map system 130 may select only levels 0-10 to be searched and map system 130 may assign weights that weigh the higher levels more heavily but do not drop-off in weighting as dramatically as in the above example for a precise location. The following Table II provides examples of weights that map system 130 may assign for each level when the location information of a query provides a city as follows:

TABLE II

| Level | Weight Assigned |
|---|---|
| 10 | 10.0 |
| 9 | 9.0 |
| 8 | 8.0 |
| 7 | 7.0 |
| 6 | 6.0 |
| 5 | 5.0 |
| 4 | 4.0 |

TABLE II-continued

| Level | Weight Assigned |
|---|---|
| 3 | 3.0 |
| 2 | 2.0 |
| 1 | 1.0 |
| 0 | 50.0 |

In one embodiment, at step 730, map system 130 may determine buffer regions surrounding each quadrant of a selected level. For example, with reference to FIG. 3, map system 130 may determine at step 720 that a query footprint will be defined for the query at level 210. At step 730, map system 130 may determine buffer regions for quadrant 1 of level 210. Quadrant 1 may represent the same area of quadtree 300 as level 220A. Buffer regions for quadrant 1 of level 210 may include the region extending between the borders of quadrant 1 of level 210 to borders 340. The distance from the borders of quadrant 1 of level 210 to buffer borders 340 may include a predetermined fraction of the distance across quadrant 1 of level 210 (e.g., of the distance).

In an alternative embodiment, with reference to FIG. 3, map system 130 may determine at step 720 that a query footprint will be defined for a query at level 210 and level 220A. At step 730, map system 130 may define query spatial identifiers for the query that will make up the query footprint for the query. Map system 130 may determine query spatial identifiers for each level selected to be queried at step 720. By way of example, map system 130 may define the following query spatial identifiers for the query (based on point Q): level 0, quadrant 1 for level 210 and level 1, quadrant 3 for level 220A.

At step 750, map system 130 may perform matching between the query spatial identifiers defined at step 740 and the POI spatial identifiers stored in the indexes. With reference to FIG. 2, map system 130 may store a first index for level 210 that includes a POI spatial identifier level 0, quadrant 1 for level 210 corresponding to a document represented by point D. Map system 130 may also store a second index for level 220A that does not include any spatial identifiers corresponding to the document represented by point D. Map system 130 may first perform matching for level 220A by determining whether there is a match between query spatial identifier level 1, quadrant 3 and any POI spatial identifier within an index for level 220A. Thereafter, map system 130 may perform matching for level 210 by determining whether there is a match between query spatial identifier level 0, quadrant 1 and any POI spatial identifier within an index for level 220A. For example, at step 750, map system 130 may determine a match between query spatial identifier level 0, quadrant 1 and POI spatial identifier level 0, quadrant 1 corresponding to the document represented by point D.

At step 760, map system 130 may calculate a score for a match between a query and a document at a spatial level. At step 770, map system 130 may provide a list of documents that are matched for a query. In certain embodiments, map system 130 may organize the list or results based on the scoring at step 760.

Figure 8:
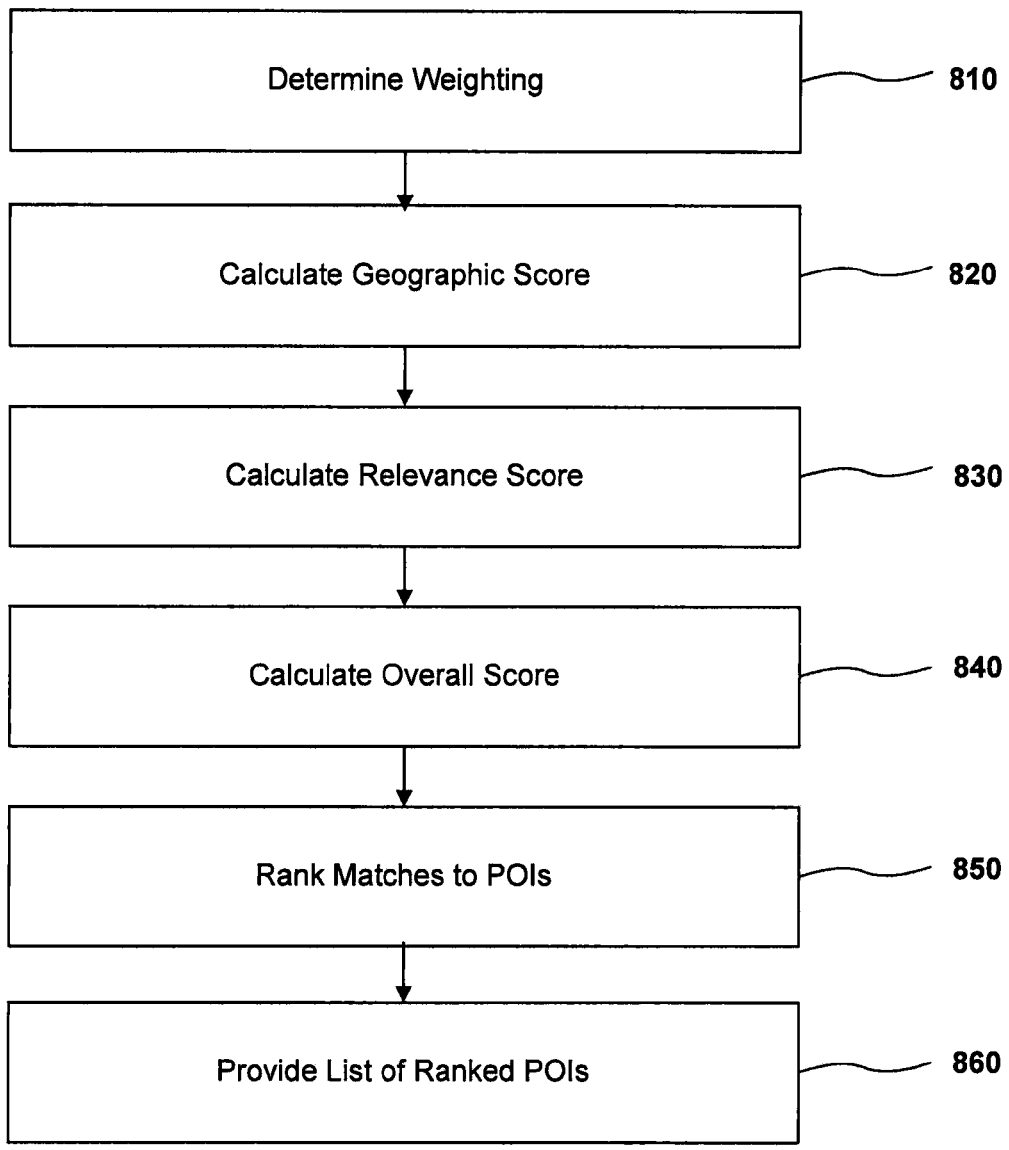
FIG. 8 is a flowchart of an exemplary method for calculating scores for matches, consistent with certain disclosed embodiments of the present disclosure.

FIG. 8 is a flowchart of an exemplary method 800, consistent with certain embodiments, for calculating scores of matches between a query and documents and providing a list of documents based on the calculations. Method 800 may be executed by map system 130 of FIG. 1. Steps 820, 830, and 840 of method 800 may correspond to step 760 of method 700. Method 700 may occur after step 560 of method 500 and before step 570 of method 500.

As illustrated in FIG. 8, at step 810, map system 130 may determine a weight assigned to each level on which a match has been found. At step 820, map system 130 may calculate a geographic score for a match. Map system 130 may calculate the geographic score based on a distance between a location associated with a query and a location of a POI associated with the matched document. At step 830, map system 130 may calculate a relevance score for the match. The map system 130 may calculate the relevance score based on a comparison of information provided as part of the query, including preference information, and/or information associated with the matched document. For example, map system 130 may compare similarity between terms specified as the preference information and terms describing the POI in the matched document. Map system 130 may also compare terms (e.g., "restaurant", "pizza", etc.) in individual categories (e.g., Business, Item) specified in the preference information and the corresponding terms describing the POI of the matched document to calculate the relevance score.

At step 840, map system 130 may calculate an overall score for a match based on a weight of a level associated with the match, a geographic score calculated at step 820 for the match, and/or a relevance score calculated for the match at step 830. Map system 130 may calculate normalized scores for geographic scores and relevance scores or normalize the calculated scores. Normalized scores may ensure that a geographic score and a relevance score may be independently emphasized when an overall score is calculated. For example, map system 130 may calculate an overall score where a geographic score and a relevance score equally affect a value of the overall score.

At step 850, map system 130 may rank documents that are matched for a query based on overall scores calculated at step 840. At one point in method 800, map system 130 may process the documents matched to the query to ensure that there is no more than one match with any one of the documents. The processing may include removing redundant matches. At step 860, map system 130 may provide a list representing the documents to user workstation 110. The list may include POIs corresponding to a predetermined number of the top ranked matched documents ranked at step 850. Map system 130 may represent each one of the documents on the list as a name of a POI described in one of the documents and information about the POI.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments may be implemented as a combination of hardware and software or in hardware alone. Examples of hardware include computing or processing systems, including personal computers, s, laptops, mainframes, micro-processors and the like. Additionally, although aspects are described for being stored in memory, one skilled in the art will appreciate that these aspects can also be stored on other types of computer-readable media, such as secondary storage devices, for example, hard disks, floppy disks, or CD-ROM, or other forms of RAM or ROM.

Computer programs based on the written description and methods are within the skill of an experienced developer. The various programs or program modules can be created using any of the techniques known to one skilled in the art or can be designed in connection with existing software. For example, program sections or program modules can be designed in or by means of C#, Java, C++, HTML, XML, or HTML with included Java applets. One or more of such software sections or modules can be integrated into a computer system or existing e-mail or browser software.

Moreover, while illustrative embodiments have been described herein, the scope of thereof includes any and all embodiments having equivalent elements, modifications, omissions, combinations (e.g., of aspects across various embodiments), adaptations and/or alterations as would be appreciated by those in the art based on the present disclosure. For example, it will be appreciated that the disclosed embodiments may be adapted for a wide variety of used workstations and map systems.

The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps. It is intended, therefore, that the specification and examples be considered as exemplary only, with a true scope and spirit being indicated by the following claims and their full scope of equivalents.

What is claimed is:

1. A computer-implemented method for processing a query for points of interest (POIs) using a hierarchical grid structure representing a geographic area, the method comprising:
   receiving a query for POIs from a user workstation;
   defining a query footprint for the query based on a location corresponding to the query and the hierarchical grid structure, wherein the query footprint comprises query spatial identifiers over one or more of a plurality of levels of the hierarchical grid structure;
   matching the query spatial identifiers with one or more POI spatial identifiers in a plurality of indexes for the hierarchical grid structure;
   assigning weights to each one of the plurality of levels based on at least one of preciseness of the location and a type of point of interest described by preference in the query;
   calculating scores based on the results of matching; and
   providing a list representing one or more POIs to the user workstation based on the scores,
   wherein calculating the scores comprises calculating based on the assigned weights.

2. The computer-implemented method of claim 1, further comprising:
   selecting one or more of the levels of the hierarchical grid structure to be searched for the query; and
   selecting one or more of the indexes corresponding to the one or more levels, wherein matching comprises matching between the query spatial identifiers and only the POI spatial identifiers in the selected indexes.

3. The computer-implemented method of claim 1, wherein:
   a first one of the POI spatial identifiers comprises a first level indicator and a first quadrant indicator corresponding to the first level of the plurality of levels; and
   a second one of the POI spatial identifiers comprises a second level indicator and a second quadrant indicator corresponding to the second level of the plurality of levels.

4. The computer-implemented method of claim 3, wherein a first one of the query spatial identifiers comprises the first level indicator and the first quadrant indicator when the first one of the query spatial identifiers matches the first one of the POI spatial identifiers.

5. The computer-implemented method of claim 1, wherein the list of POIs includes at least one of a business listing, a public entity, a property for sale or rent, and a moving entity.

6. The computer-implemented method of claim 1, wherein:
   the list is a rank ordering of the one or more POIs based on the scores; and
   a first one of the scores is calculated based on a geographic score, a relevance score, and a weight of one of the plurality of levels, for a match between a first one of the POI spatial identifiers and a first one of the query spatial identifiers on the one of the plurality of levels.

7. The computer-implemented method of claim 1, further comprising:
   prior to receiving the query, defining a first POI footprint by:
      determining a significance a first POI;
      selecting one or more of the plurality of levels for which to define the POI spatial identifiers for the first POI based on the determined significance of the first POI; and
      defining the POI spatial identifiers for the first POI only on the selected levels.

8. The computer-implemented method of claim 1, wherein the plurality of levels in the hierarchical grid structure are defined based on at least one of population information and predetermined map information.

9. The computer-implemented method of claim 1, wherein defining the query footprint comprises generating the query spatial identifiers based on a latitude of the location and a longitude of the location.

10. The computer-implemented method of claim 1, wherein a first one of the POI spatial identifiers comprises a first level indicator and a first quadrant indicator when the position of a first POI indicates that an address corresponding to the first POI is located within a grid defined by the first level indicator and the first quadrant indicator, when the position is located within a predetermined buffer region around the grid, or when a buffer around the position is within the grid.

11. A computer-implemented method for processing a query for points of interest (POIs) using a hierarchical grid structure representing a geographic area, the method comprising:
   receiving a query for POIs from a user workstation;
   defining a query footprint for the query based on a location corresponding to the query, wherein the query footprint comprises query spatial identifiers for a plurality of levels of the hierarchical grid structure;
   matching the query spatial identifiers with one or more POI spatial identifiers organized into a plurality of indexes, wherein each one of the plurality of indexes comprises an index of the POI spatial identifiers for one of the plurality of levels;
   assigning weights to each one of the plurality of levels based on at least one of preciseness of the location and a type of point of interest described by preferences in the query;
   calculating scores for the matched POI spatial identifiers based on the assigned weights; and
   providing, to the user workstation, an output specifying one or more POIs corresponding to the matched POI spatial identifiers, based on the scores.

12. The computer-implemented method of claim 11, further comprising:
   receiving documents concerning a plurality of POIs from one or more data systems;

defining POI footprints for the plurality of POIs based on location information of each POI, wherein the POI footprints comprise the POI spatial identifiers; and creating the indexes for the plurality of POIs based on the POI spatial identifiers.

13. The computer-implemented method of claim 11, further comprising:

selecting one or more of the plurality of levels to be searched based on the query, wherein defining the query footprint comprises defining the query spatial identifiers only corresponding to the one or more selected levels; and selecting one or more of the plurality of indexes corresponding to the one or more selected levels, wherein performing matching comprises matching between the query spatial identifiers and only the POI spatial identifiers in the one or more selected indexes.

14. The computer-implemented method of claim 11, wherein:

a first one of the query spatial identifiers comprises a first level indicator and a first quadrant indicator corresponding to a first level of the plurality of levels in the hierarchical grid structure;

a second one of the query spatial identifiers comprises a second level indicator and a second quadrant indicator corresponding to a second level of the plurality of levels in the hierarchical grid structure, and the second level is a quadrant of an area indicated by the first level indicator.

15. The computer-implemented method of claim 14, wherein a first one of the POI spatial identifiers comprises the first level indicator and the first quadrant indicator when the first one of the POI spatial identifiers matches the first one of the query spatial identifiers.

16. A system for processing a query for points of interest (POIs) using a hierarchical grid structure representing a geographic area, the system comprising:

a storage device configured to store a plurality of indexes, wherein each one of the indexes comprises an index of POI spatial identifiers for a plurality of levels of the hierarchical grid structure; and a computer processor configured to:

receive a query from a user workstation;

define a query footprint for the query based on a location corresponding to the query, wherein the query footprint comprises query spatial identifiers for one or more of the plurality of levels;

perform matching between the query spatial identifiers and the POI spatial identifiers in one or more of the plurality of indexes;

assign weights to each on of the plurality of levels based on at least one of preciseness of the location and a type of point of interest described by preferences in the query;

calculate scores for the matched POI spatial identifiers based on the assigned weights; and provide an output representing one or more matched POIs corresponding to the matched POI spatial identifiers, based on the scores.

17. The system of claim 16, wherein the processor is further configured to:

receive documents for a plurality of POIs from one or more data systems;

define POI footprints for the plurality of plurality POIs based on location information of each POI, wherein the POI footprints comprise the POI spatial identifiers;

create the indexes for the plurality of point of interests based on the POI spatial identifiers; and store the plurality of indexes in the storage.

* * * * *